(12) United States Patent
Nakano

(10) Patent No.: US 10,167,985 B2
(45) Date of Patent: Jan. 1, 2019

(54) PRESSURE BUFFER DEVICE

(71) Applicant: Showa Corporation, Gyoda-shi (JP)

(72) Inventor: Gota Nakano, Gyoda (JP)

(73) Assignee: SHOWA CORPORATION, Gyoda-Shi (JP)

( * ) Notice: Subject to any disclaimer, the term of this patent is extended or adjusted under 35 U.S.C. 154(b) by 80 days.

(21) Appl. No.: 15/335,008

(22) Filed: Oct. 26, 2016

(65) Prior Publication Data

US 2017/0184245 A1    Jun. 29, 2017

(30) Foreign Application Priority Data

Dec. 24, 2015 (JP) ................. 2015-252509

(51) Int. Cl.
| | |
|---|---|
| *F16L 55/04* | (2006.01) |
| *F16L 55/05* | (2006.01) |
| *F16F 9/348* | (2006.01) |
| *F16F 9/18* | (2006.01) |
| *F16F 9/32* | (2006.01) |

(52) U.S. Cl.
CPC .............. *F16L 55/05* (2013.01); *F16F 9/185* (2013.01); *F16F 9/3235* (2013.01); *F16F 9/3484* (2013.01)

(58) Field of Classification Search
CPC .......... F16L 55/05; B60G 13/08; B60G 17/08
USPC ...................... 138/30, 31; 188/282.5, 322.15
See application file for complete search history.

(56) References Cited

U.S. PATENT DOCUMENTS

| | | | | |
|---|---|---|---|---|
| 2,335,907 A | * | 12/1943 | Boor ...................... | F16F 9/443 188/282.5 |
| 2,467,098 A | * | 4/1949 | Rossman .............. | F16F 9/3405 137/493.8 |
| 2,500,708 A | * | 3/1950 | Rossman ................ | F16F 9/185 188/315 |
| 4,819,772 A | | 4/1989 | Rubel | |
| 5,522,486 A | * | 6/1996 | Fulks ........................ | F16F 9/34 188/286 |
| 6,382,371 B1 | * | 5/2002 | Oliver .................. | B60G 17/044 188/269 |

(Continued)

FOREIGN PATENT DOCUMENTS

| | | |
|---|---|---|
| CN | 105074266 A | 11/2015 |
| DE | 4102002 A | 7/1992 |

(Continued)

OTHER PUBLICATIONS

Extended European Search Report dated Apr. 28, 2017 for the corresponding European Patent Application No. 16195907.7.

(Continued)

*Primary Examiner* — James Hook
(74) *Attorney, Agent, or Firm* — Leason Ellis LLP

(57) ABSTRACT

One embodiment discloses a pressure buffer device, which includes a pipe-shaped member that stores fluid, and a partitioning member that is movably provided in the pipe-shaped member to partition its space into a first space and a second space. The pressure buffer device further includes a fluid reservoir portion that is arranged at the a radial outer side of the pipe-shaped member to store fluid, and a communication path that is arranged at a radial outer side of the fluid reservoir portion to communicate between the first space and the second space.

10 Claims, 13 Drawing Sheets

(56) References Cited

U.S. PATENT DOCUMENTS

| | | | | |
|---|---|---|---|---|
| 6,655,512 B2* | 12/2003 | Moradmand | ........... | F16F 9/348 |
| | | | | 188/282.5 |
| 2008/0035902 A1 | 2/2008 | Murakami et al. | | |
| 2010/0006383 A1* | 1/2010 | Jee | ......................... | F16F 9/325 |
| | | | | 188/322.13 |
| 2013/0275003 A1* | 10/2013 | Uchino | ................. | B60G 17/06 |
| | | | | 701/40 |
| 2015/0217621 A1* | 8/2015 | Yamashita | ............. | B60G 13/08 |
| | | | | 188/266.2 |
| 2016/0059663 A1* | 3/2016 | Teraoka | ................ | F16F 9/5126 |
| | | | | 188/266.2 |
| 2016/0281815 A1 | 9/2016 | Teraoka et al. | | |

FOREIGN PATENT DOCUMENTS

| | | |
|---|---|---|
| DE | 4320446 A | 2/1994 |
| FR | 2613797 A | 10/1988 |
| GB | 2154700 A | 9/1985 |
| GB | 2269437 A | 2/1994 |
| JP | 60-183217 A | 9/1985 |
| JP | 2013-242031 A | 12/2013 |

OTHER PUBLICATIONS

Office Action dated Aug. 3, 2018 for the corresponding Chinese Patent Application No. 201610956329.4.

* cited by examiner

PRESSURE BUFFER DEVICE

CROSS-REFERENCE TO RELATED APPLICATION(S)

This application claims priority from Japanese Patent Application No. 2015-252509 filed on Dec. 24, 2015, the entire contents of which are incorporated herein by reference.

BACKGROUND

1. Field

The present invention relates to a pressure buffer device.

2. Related Art

JP-2013-242031-A discloses a hydraulic buffer device including a cylinder that defines a piston oil chamber and a rod oil chamber, and an outer cylinder body that defines a return path providing communication between the piston oil chamber and the rod oil chamber in corporation with the cylinder and defines a reservoir chamber in corporation with a damper case.

In such a pressure buffer device, damping force is generated, for example, by arranging an applying member that applies drag to flowing fluid to decrease flowing easiness of the fluid. Here, there is a case that a communication path that connects two fluid chambers are arranged in the pressure buffer device. If the communication path is arranged at a position close to the center of the pressure buffer device, a space for arranging the applying member is reduced. In this case, there arises limitation for the applying member in size and an adjustment range of damping force that can be set in the pressure buffer device may be narrowed.

SUMMARY

An aspect of the present invention provides a pressure buffer device including a pipe-shaped member that stores fluid, a partitioning member that partitions a space in the pipe-shaped member into a first space and a second space as being movable in an axial direction of the pipe-shaped member, a fluid reservoir portion that stores the fluid in accordance with movement of the partitioning member as being arranged at an outer side of the pipe-shaped member in a radial direction of the pipe-shaped member, and a communication path that provides communication between the first space and the second space as being arranged at an outer side of the fluid reservoir portion in the radial direction of the pipe-shaped member.

According to the above configuration, a size selection range of an applying member that applies drag to flowing fluid is increased and flexibility for setting damping force of the pressure buffer device can be improved.

According to the above-mentioned aspect of the present invention, it is possible to improve flexibility for setting damping force of a pressure buffer device.

DETAILED DESCRIPTION OF EMBODIMENTS

Embodiments will be described with reference to the attached drawings.

Figure 1:
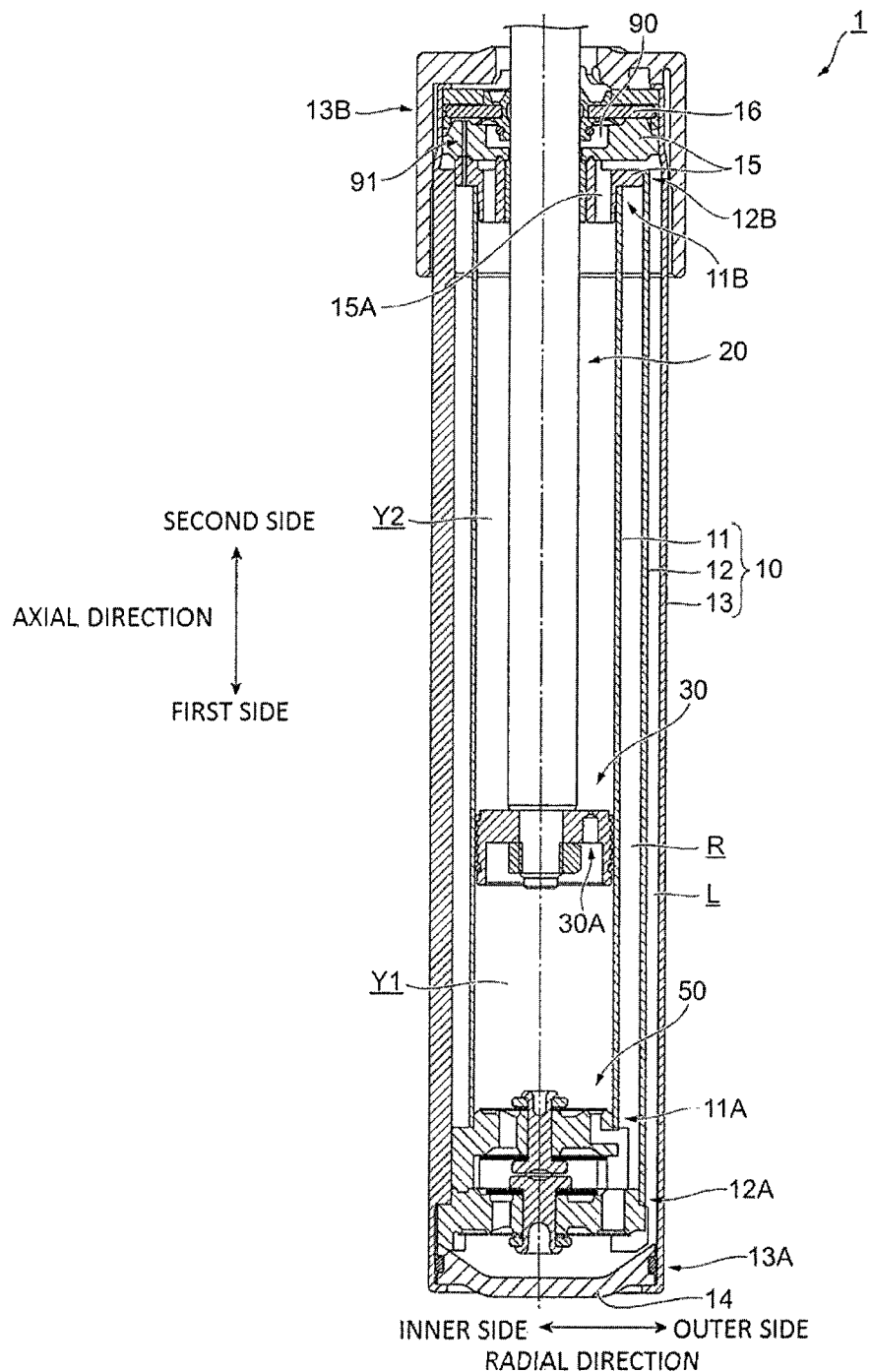
FIG. 1 is a whole structural view of a hydraulic buffer device of an embodiment.

FIG. 1 is a whole structural view of a hydraulic buffer device 1 of an embodiment. In the following description, the lower side and the upper side in the axial direction of the hydraulic buffer device in FIG. 1 are referred to as "a first side" and "a second side", respectively. Further, a side toward the center and a side toward the outer side in the radial direction of the hydraulic buffer device 1 are referred to as "a center side" and "an outer side", respectively.

As illustrated in FIG. 1, the hydraulic buffer device 1 includes a cylinder portion 10, a rod member 20, a piston member 30, and a bottom valve portion 50. Here, damping force is generated at the bottom valve portion 50. A section where the bottom valve portion 50 is arranged serves as a damping force generating mechanism that generates damping force.

The hydraulic buffer device 1 (pressure buffer device) includes a cylinder 11 (pipe-shaped member) that stores oil (fluid), and the piston member 30 (partitioning member) that partitions a space in the cylinder 11 into a first oil chamber Y1 (first space) and a second oil chamber Y2 (second space) as being movable in the axial direction of the cylinder 11. Further, the hydraulic buffer device 1 includes a reservoir chamber R (fluid reservoir portion) that stores oil in accordance with movement of the piston member 30 as being arranged at the outer side of the cylinder 11 in the radial direction of the cylinder 11, and a communication path L that provides communication between the first oil chamber Y1 and the second oil chamber Y2 as being arranged at the outer side of the reservoir chamber R in the radial direction of the cylinder 11.

Further, the hydraulic buffer device 1 includes a pipe-shaped outer cylinder body 12 (first outer member) arranged at the outer side of the cylinder 11, and a pipe-shaped damper case 13 (second outer member) arranged at the outer side of the outer cylinder body 12. A space between the cylinder 11 and the outer cylinder body 12 serves as the reservoir chamber R, and a space between the outer cylinder body 12 and the damper case 13 serves as the communication path L.

In the following, configurations of the above will be described in detail.

The second side of the rod member 20 is protruded outside the cylinder portion 10 and the first side thereof is located at the inside of the cylinder portion 10. The rod member 20 slides in the axial direction of the cylinder portion 10. The piston member 30 is attached to an end on the first side of the rod member 20. A connecting member (not illustrated) is attached to an end on the second side of the rod member 20. The connecting member connects the hydraulic buffer device 1 to a vehicle body of an automobile or the like.

The cylinder portion 10 includes the cylinder 11, the outer cylinder body 12 arranged at the outer side of the cylinder 11, the damper case 13 arranged at the outer side of the outer cylinder body 12, and a bottom portion 14 arranged at an end of the damper case 13 on the first side in the axial direction. Further, the cylinder portion 10 includes a rod guide 15 that guides the rod member 20 and an oil seal 16 that prevents oil leakage from the cylinder portion 10.

The cylinder 11 is formed of a thin cylindrical member with openings formed respectively at ends 11A, 11B on the first and second sides thereof. The opening formed at the end 11A on the first side is closed by the bottom valve portion 50 and the opening formed at the end 11B on the second side is closed by the rod guide 15. Oil is stored in the cylinder 11.

The outer cylinder body 12 is formed of a thin cylindrical member with openings formed respectively at ends 12A, 12B on the first and second sides thereof. The outer cylinder body 12 is arranged at the outer side of the cylinder 11 and at the inner side of damper case 13 in a state of being distanced from the cylinder 11. The opening formed at the end 12A on the first side is closed by the bottom valve portion 50 and the opening formed at the end 12B on the second side is closed by the rod guide 15.

The damper case 13 is formed of a thin cylindrical member with openings formed respectively at ends 13A, 13B on the first and second sides. The damper case 13 is arranged at the outer side of the outer cylinder body 12 in a state of being distanced from the outer cylinder body 12. The opening formed at the end 13A on the first side is closed by the bottom portion 14 and the opening formed at the end 13B on the second side is closed by the rod guide 15.

In the present embodiment, at least two of the cylinder 11 (pipe-shaped member), the outer cylinder body 12 (first outer member), and the damper case 13 (second outer member) are formed integrally. However, it is also possible that those are formed separately.

Figure 2:
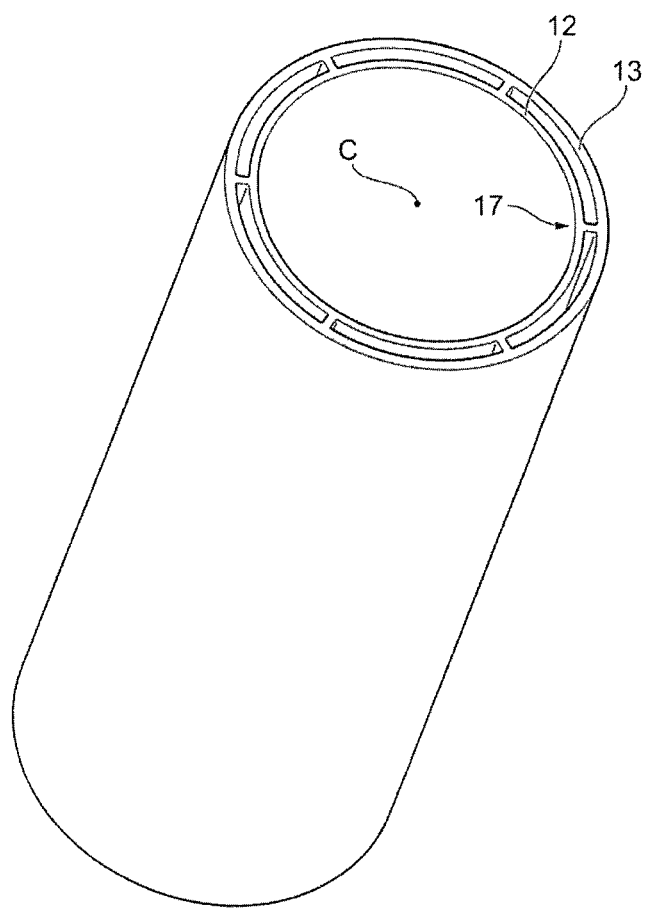
FIG. 2 is a view illustrating an outer cylinder body and a damper case.

FIG. 2 illustrates the outer cylinder body 12 and the damper case 13. Here, the outer cylinder body 12 and the damper case 13 are formed integrally. For example, a cylindrical body in which the outer cylinder body 12 and the damper case 13 are integrally formed is formed with drawing. Then, the cylinder 11 is arranged in the cylindrical body.

In the present embodiment, description is provided on an example that the outer cylinder body 12 and the damper case 13 are integrally formed. However, it is also possible to integrally form the cylinder 11 and the outer cylinder body 12 or to integrally form the cylinder 11, the outer cylinder body 12, and the damper case 13.

As illustrated in FIG. 2, a plurality of ribs 17 connecting the outer cylinder body 12 and the damper case 13 are formed therebetween. The ribs 17 are extended in the axial direction of the outer cylinder body 12 and the damper case 13. The ribs 17 are arranged radially from the center C of the outer cylinder body 12 and the damper case 13 in the radial direction.

Returning to FIG. 1, the hydraulic buffer device 1 will be further described. The bottom portion 14 is arranged at the end 13A on the first side of the damper case 13 and closes the opening formed thereat. The rod guide 15 guides the rod member 20 that moves in the axial direction. The oil seal 16 is fixed to the end 13B on the second side of the damper case 13. The oil seal 16 is intimately contacted to an outer circumferential face of the rod member 20 and prevents leakage of oil from the inside to the outside of the cylinder portion 10. Further, the oil seal 16 prevents foreign matters from entering into the cylinder portion 10.

The space inside the cylinder 11 is partitioned by the piston member 30 that is an example of the partitioning member, so that the first oil chamber Y1 and the second oil chamber Y2 are formed in the cylinder 11. The first oil chamber Y1 is located on the first side of the piston member 30 and the second oil chamber Y2 is located on the second side of the piston member 30.

The space between the cylinder 11 and the outer cylinder body 12 serves as the reservoir chamber R that is an example of the fluid reservoir portion. Oil is stored in the reservoir chamber R in accordance with movement of the piston member 30 toward the first side. The reservoir chamber R stores oil flowing from the inside of the cylinder 11 and supplies oil to the inside of the cylinder 11 to compensate oil by the volume amount of movement of the rod member 20 moving in the cylinder 11.

The space between the outer cylinder body 12 and the damper case 13 is connected to the first oil chamber Y1 and the second oil chamber Y2. The space serves as the communication path L for oil to be transferred from the first oil chamber Y1 to the second oil chamber Y2 and from the second oil chamber Y2 to the first oil chamber Y1. Here, as illustrated in FIG. 1, the rod guide 15 includes a connection path 15A that connects the communication path L and the second oil chamber Y2. Oil passes through the connection path 15A when being transferred between the communication path L and the second oil chamber Y2.

The piston member 30 is formed of a columnar member and an outer circumferential face thereof is contacted to an inner circumferential face of the cylinder 11. A through-hole 30A is formed at the piston member 30 along the axial direction thereof.

[Configuration of Bottom Valve Portion 50]

Figure 3:
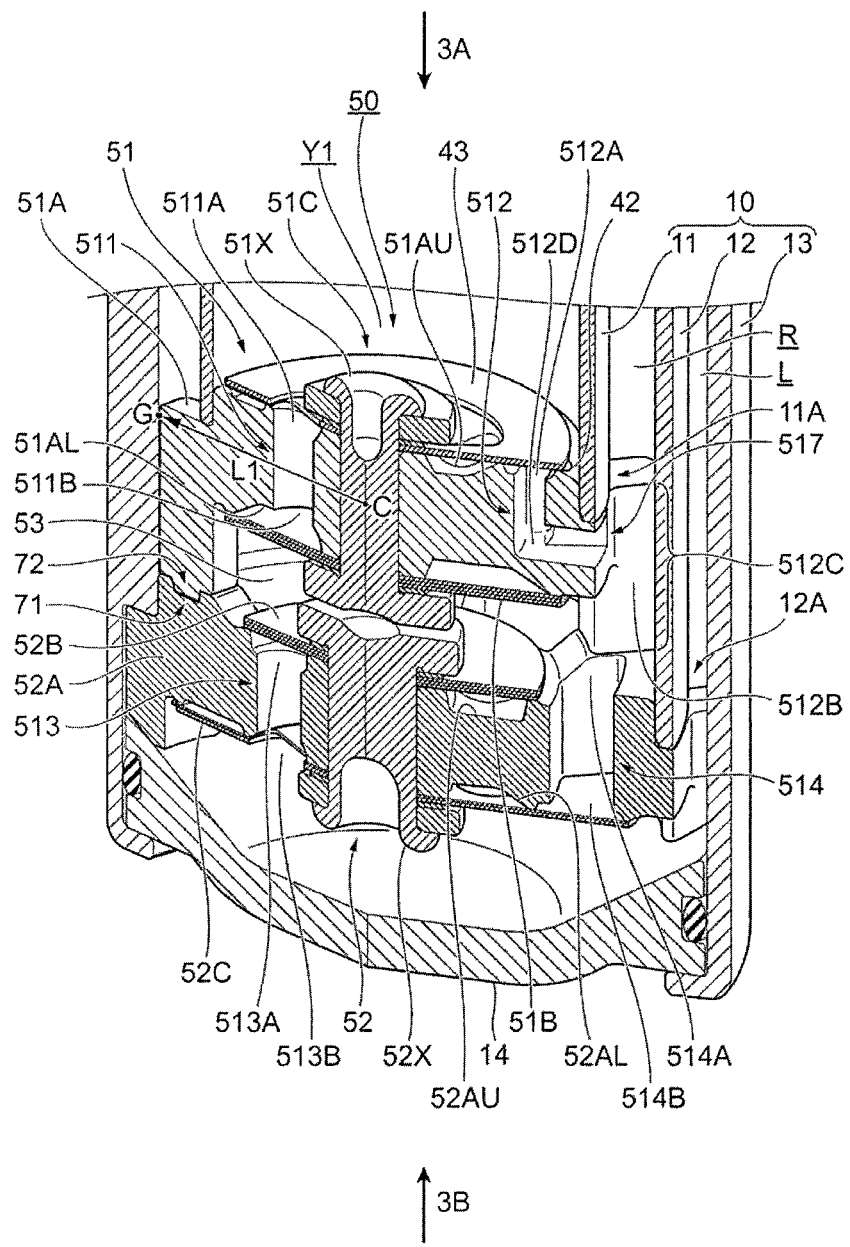
FIG. 3 is a perspective view of a bottom valve portion.

FIG. 3 is a perspective view of the bottom valve portion 50.

The bottom valve portion 50 includes first and second bottom members 51, 52 located on the first side of the first bottom member 51. The first bottom member 51 is attached to the end 11A on the first side of the cylinder 11 and closes the opening at the end 11A. The second bottom member 52 is attached to the end 12A on the first side of the outer cylinder body 12 and closes the opening at the end 12A. A space 53 (hereinafter, called an intermediate chamber 53) is formed between the first bottom member 51 and the second bottom member 52.

The first bottom member 51 includes a valve seat 51A (hereinafter, called an upper valve seat 51A) serving as a base body. A compression-side valve 51B is arranged at a position facing to an end face 51AL (hereinafter, called a lower end face 51AL) on the first side of the upper valve seat 51A. A compression-side check valve 51C is arranged at a position facing to an end face 51AU (hereinafter, called an upper end face 51AU) on the second side of the upper valve seat 51A.

The second bottom member 52 includes a valve seat 52A (hereinafter, called a lower valve seat 52A) serving as a base body. An extension-side valve 52B is arranged at a position facing to an end face 52AU (hereinafter, called an upper end face 52AU) on the second side of the lower valve seat 52A. An extension-side check valve 52C is arranged at a position facing to an end face 52AL (hereinafter, called a lower end face 52AL) on the first side of the lower valve seat 52A.

In the following, description will be provided on the first bottom member 51.

A plurality of compression-side oil paths 511 are formed at the upper valve seat 51A along the axial direction thereof. When the piston member 30 is moved toward the first side in the axial direction, oil flows from the first oil chamber Y1 toward the reservoir chamber R and the communication path L as passing through the compression-side oil paths 511.

Further, a plurality of extension-side oil paths 512 are formed at an outer circumference of the upper valve seat 51A. When the piston member 30 is moved toward the second side in the axial direction, oil flows from the reservoir chamber R and the communication path L toward the first oil chamber Y1 as passing through the extension-side oil paths 512.

Each of the extension-side oil paths 512 includes a first connection oil path 512C and a second connection oil path 512D. The first connection oil path 512C is arranged along the axial direction of the upper valve seat 51A to connect the reservoir chamber R and the intermediate chamber 53. The second connection oil path 512D is formed into an L-shape to connect the first connection oil path 512C and the first oil chamber Y1.

Here, positions of the compression-side oil paths 511 are deviated from those of the extension-side oil paths 512 in the circumferential direction of the upper valve seat 51A.

Upper inlet ports 511A through which oil flows in and upper outlet ports 512A through which oil flows out are formed on the upper end face 51AU of the upper valve seat 51A. Lower inlet ports 512B through which oil flows in and lower outlet ports 511B through which oil flows out are formed on the lower end face 51AL of the upper valve seat 51A. The compression-side oil path 511 connects the upper inlet port 511A and the lower outlet port 511B. The extension-side oil path 512 connects the upper outlet port 512A and the lower inlet port 512B.

The compression-side valve 51B closes the lower outlet ports 511B and the compression-side check valve 51C closes the upper outlet ports 512A. Further, a fixing member 51X is provided to fix the compression-side valve 51B and the compression-side check valve 51C to the upper valve seat 51A.

In the following, description will be provided on the second bottom member 52.

A plurality of compression-side oil paths 514 are formed at the lower valve seat 52A along the axial direction thereof. When the piston member 30 is moved toward the first side in the axial direction, oil flows from the intermediate chamber 53 toward the communication path L as passing through the compression-side oil paths 514.

Further, a plurality of extension-side oil paths 513 are formed at the lower valve seat 52A. When the piston member 30 is moved toward the second side in the axial direction, oil flows from the communication path L toward the intermediate chamber 53 as passing through the extension-side oil paths 513.

Here, positions of the compression-side oil paths 514 are deviated from those of the extension-side oil paths 513 in the circumferential direction of the lower valve seat 52A.

Upper inlet ports 514A through which oil flows in and upper outlet ports 513A through which oil flows out are formed on the upper end face 51AU of the lower valve seat 52A. Lower inlet ports 513B though which oil flows in and lower outlet ports 514B through which oil flows out are formed on the lower end face 52AL of the lower valve seat 52A. The compression-side oil path 514 connects the upper inlet port 514A and the lower outlet port 514B. The extension-side oil path 513 connects the upper outlet port 513A and the lower inlet port 513B.

The extension-side valve 52B closes the upper outlet ports 513A and the extension-side check valve 52C closes the lower outlet ports 514B. Further, a fixing member 52X is provided to fix the extension-side valve 52B and the extension-side check valve 52C to the lower valve seat 52A.

[Operation of Hydraulic Buffer Device 1]

Figure 4:
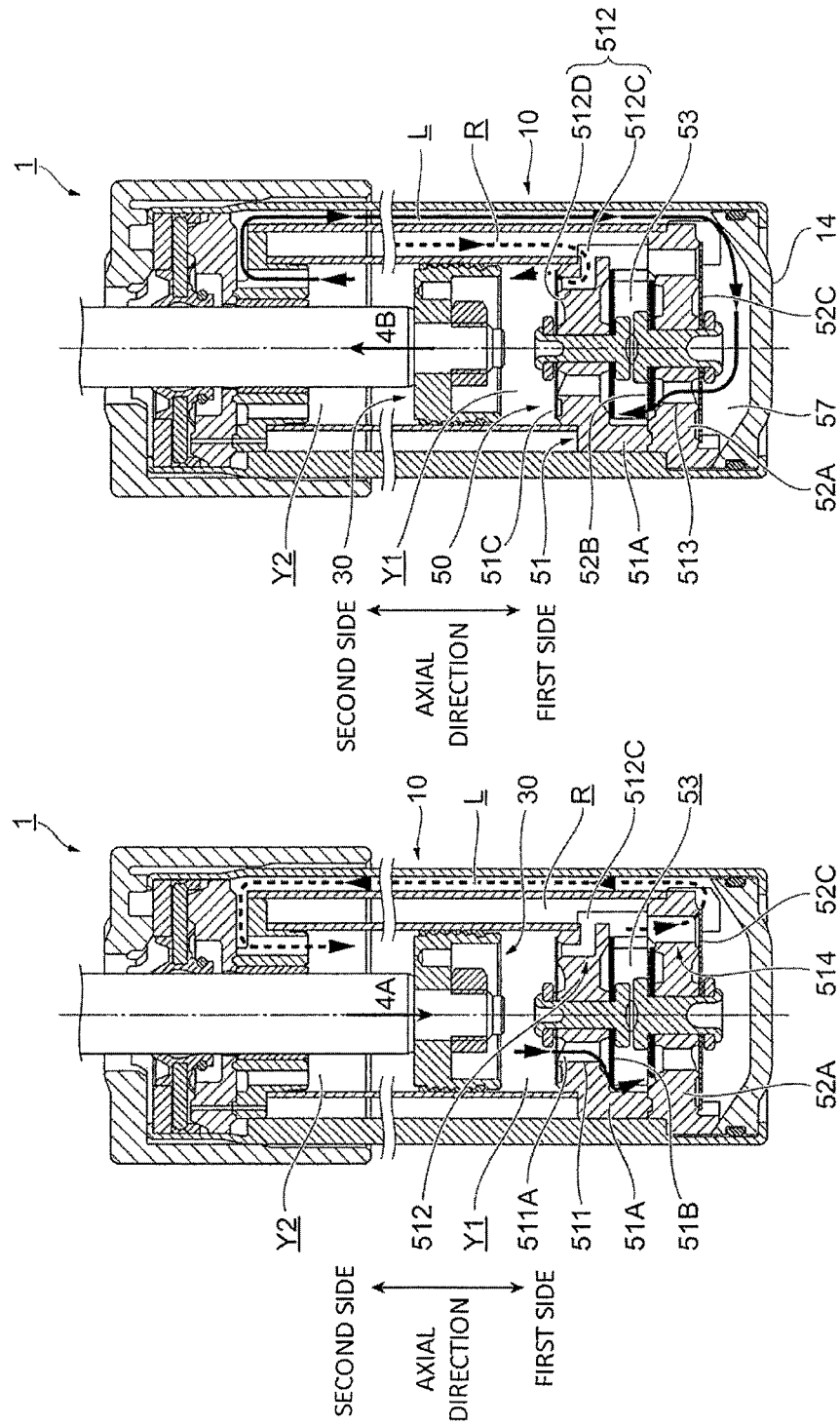
FIGS. 4A and 4B are views illustrating operation of the hydraulic buffer device.

FIGS. 4A and 4B are views illustrating operation of the hydraulic buffer device 1. FIG. 4A illustrates operation of the hydraulic buffer device 1 in a compression stroke and FIG. 4B illustrates operation of the hydraulic buffer device 1 in an extension stroke.

First, description will be provided on the operation of the hydraulic buffer device 1 in the compression stroke.

As indicated by an arrow 4A in FIG. 4A, when the piston member 30 is moved toward the first side in the axial direction of the cylinder portion 30, oil in the first oil chamber Y1 is compressed and pressure in the first oil chamber Y1 is increased. When the pressure in the first oil chamber Y1 increases, oil flows into the compression-side oil paths 511 through the upper inlet ports 511A and presses the compression-side valve 51B. Accordingly, the compression-side valve 51B is deformed and bent. Thus, the compression-side valve 51B is opened and oil flows into the intermediate chamber 53. Drag of oil occurring when oil passes through the compression-side oil paths 511 and the compression-side valve 51B causes damping force in the compression-stroke.

Oil flowed into the intermediate chamber 53 flows toward the communication path L through the compression-side oil paths 514. Then, oil flows into the second oil chamber Y2 through the communication path L. Further, oil flowed into the intermediate chamber 53 flows into the reservoir chamber R through the first connection oil paths 512C of the extension-side oil paths 512. When oil flows toward the communication path L through the compression-side oil paths 514, the extension-side check valve 52C is pressed and opened. Drag of oil occurs as well when the extension-side check valve 52C is opened.

Next, description will be provided on the operation of the hydraulic buffer device 1 in the extension stroke.

As indicated by an arrow 4B in FIG. 4B, when the piston member 30 is moved toward the second side, oil in the second oil chamber Y2 is compressed and pressure in the second oil chamber Y2 is increased. Accordingly, oil in the second oil chamber Y2 flows through the communication path L toward a space 57 (hereinafter, called a bottom space 57) located between the bottom valve portion 50 and the bottom portion 14.

Oil flowed into the bottom space 57 flows into the extension-side oil paths 513 and presses the extension-side valve 52B. Accordingly, the extension-side valve 52B is deformed and bent. Thus, the extension-side valve 52B is opened and oil flows into the intermediate chamber 53. At that time, drag of oil occurs and damping force is generated.

Subsequently, oil flows into the first oil chamber Y1 through the extension-side oil paths 512 (first and second connection oil paths 512C, 512D). At that time, the compression-side check valve 51C is opened.

Further, when the piston member 30 is moved toward the second side, pressure reduction in the first oil chamber Y1 causes oil in the reservoir chamber R to flow toward the first oil chamber Y1 through the extension-side oil paths 512.

According to the present embodiment, compared to a later-described comparison example, the extension-side check valve 52C arranged at the second bottom member 52 can have a larger diameter, so that damping force in the compression stroke can be set to a value in a wide range. Further, the compression-side check valve 51B arranged at the first bottom member 51 can have a larger diameter, so that damping force in the compression stroke can be set to a value in a wide range as well.

Figure 5:
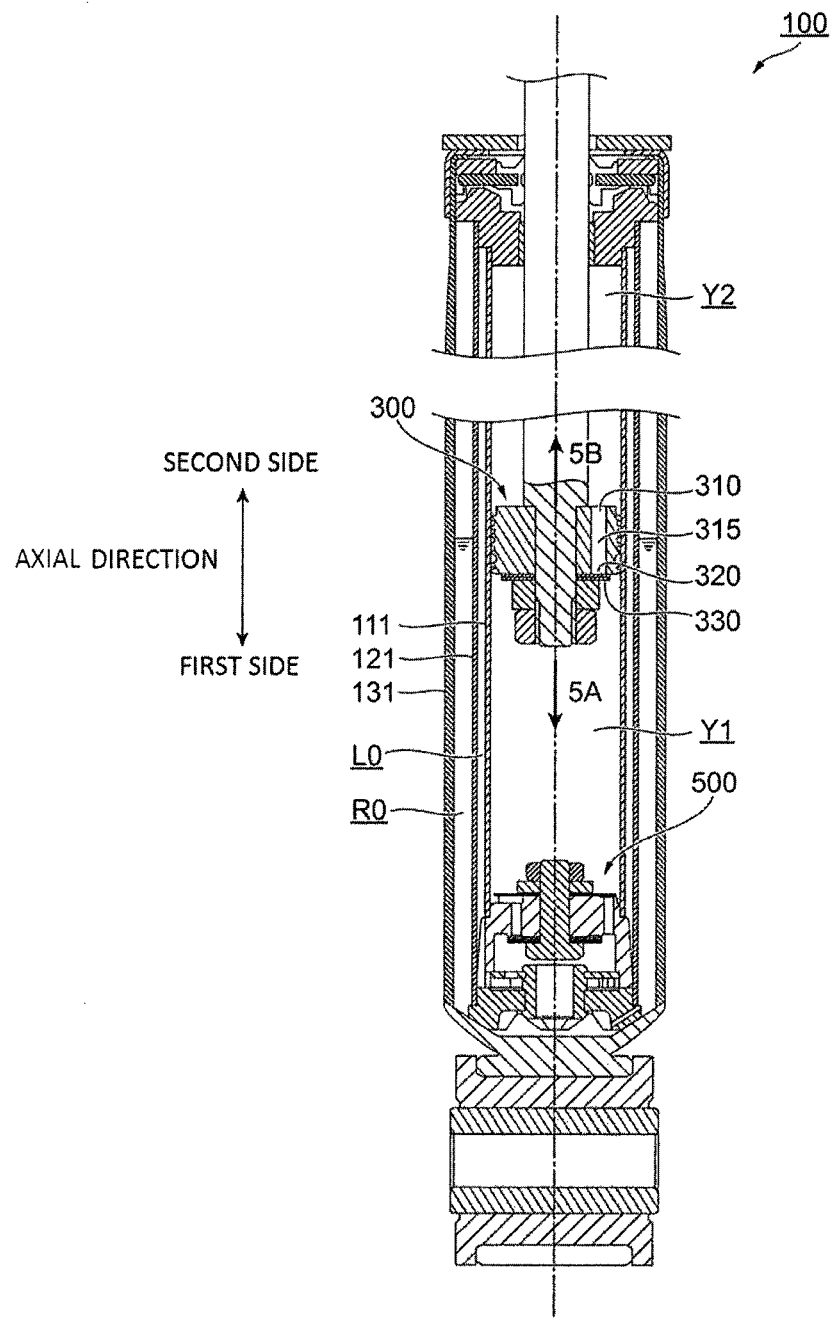
FIG. 5 is a view illustrating a comparison example of the hydraulic buffer device.
Figure 6:
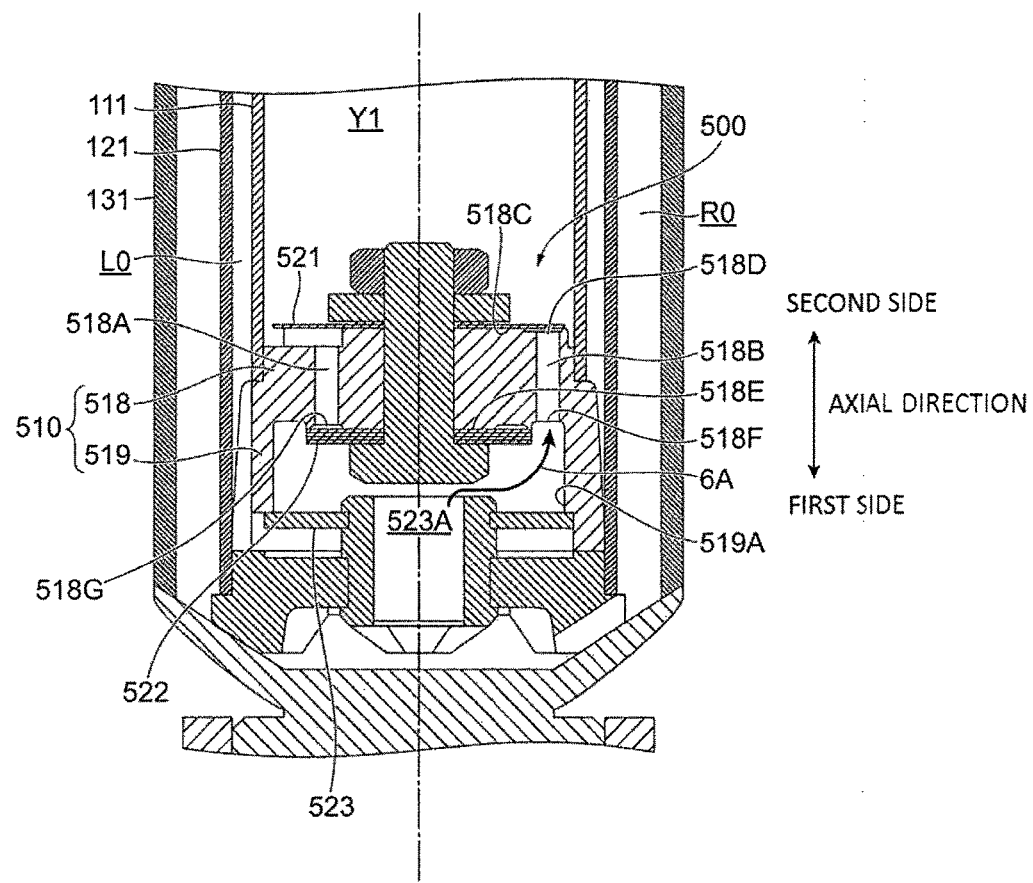
FIG. 6 is a view illustrating a comparison example of the hydraulic buffer device.

FIGS. 5 and 6 are views illustrating a comparison example of a hydraulic buffer device. FIG. 5 is a whole structural view of a hydraulic buffer device 100 of the comparison example. FIG. 6 is an enlarged view of a bottom valve portion 500 of the comparison example.

In the comparison example, as illustrated in FIG. 5, an inlet port 310 through which oil flows in is formed on the second side of a piston member 300 and an outlet port 320 through which oil flows out is formed on the first side of the piston member 300. An extension-side oil path 315 is formed to connect the inlet port 310 and the outlet port 320. An extension-side valve 330 to close the outlet port 320 is arranged on the first side of the piston member 300.

In this comparison example, in the extension stroke of the hydraulic buffer device 100, the extension-side valve 330 is opened and damping force is generated.

As illustrated in FIG. 6, the bottom valve portion 500 includes a valve seat 510. The valve seat 510 includes a columnar portion 518 and a cylindrical portion 519. The columnar portion 518 is located on the second side of the cylindrical portion 519. A compression-side oil path 518A and an extension-side oil path 518B are arranged at the columnar portion 518.

Further, the bottom valve portion 500 includes an upper check valve 521 that closes an opening 518D (i.e., an opening 518D through which oil flows out from the extension-side oil path 518B) formed at an end face 518C on the second side of the columnar portion 518.

Further, the valve portion 500 includes a compression-side valve 522 that closes an opening 518G (i.e., an opening 518G through which oil flows out from the compression-side oil path 518A) formed at an end face 518E on the first side of the columnar portion 518. A lower check valve 523 that closes an opening 519A on the first side of the cylindrical portion 519 is arranged on the first side of the cylindrical portion 519. A communication path L0 is formed between a cylinder 111 and an outer cylinder body 121 and a reservoir chamber R0 is formed between the outer cylinder body 121 and a damper case 131.

In the following, operation of the hydraulic buffer device 100 of the comparison example will be described.

When the piston member 300 is moved toward the first side as indicated by an arrow 5A in FIG. 5, oil in the first oil chamber Y1 is compressed by the piston member 300 and pressure in the first oil chamber Y1 is increased. When the pressure in the first oil chamber Y1 is increased, oil flows into the compression-side oil path 518A and presses the compression-side valve 522.

Accordingly, the compression-side valve 522 is opened. Further, oil presses the lower check valve 523 and the lower check valve 523 is opened. Then, oil flows toward the second oil chamber Y2 through the communication path L0. Further, oil flows toward the reservoir chamber R0 through a through-hole 523A formed at the center of the lower check valve 523.

On the other hand, when the piston member 300 is moved toward the second side as indicated by an arrow 5B in FIG. 5, pressure in the second oil chamber Y2 is increased. Accordingly, oil in the second oil chamber Y2 flows toward the first oil chamber Y1 through the compression-side oil path 315 of the piston member 300. Then, oil opens the extension-side valve 330 and damping force is generated.

Further, when the piston member 300 is moved toward the second side, pressure in the first oil chamber Y1 is decreased and oil flows from the reservoir chamber R0 toward the first oil chamber Y1. At that time, oil flowing from the reservoir oil chamber R0 firstly flows into a space between the compression-side valve 522 and the lower check valve 523 through the through-hole 523A. Then, oil flows into the first oil chamber Y1 through the extension-side oil path 518B. At that time, oil presses and opens the upper check valve 521.

The opening 519A of the cylindrical portion 519 is closed by the lower check valve 523, so that oil in the communication path L0 cannot flow into the cylindrical portion 519A. Accordingly, oil in the communication path L0 is not moved even when the piston member 30 is moved toward the second side. Here, assuming that oil in the communication path L0 is moved, the extension-side valve 330 is less likely to be opened and damping force is less likely to be generated.

In the comparison example, the diameter size of the lower check valve 523 is more likely to be limited, so that damping force to be generated in the compression stroke is more likely to become large. Assuming that the diameter of the lower check valve 523 is set large, the lower check valve 523 closes the communication path L0. Thus, diameter limitation exists for the lower check valve 523, that is, the diameter of the lower check valve 523 is more likely to be small.

In the compression stroke, oil passing through the compression-side oil path 518A presses and opens the lower check valve 523. Here, when the diameter of the lower check valve 523 is small, the lower check valve 523 is less likely to be bent. Accordingly, the lower check valve 523 is less likely to be opened and damping force to be generated in the compression stroke is more likely to be large.

Further, when oil in the reservoir chamber R0 is moved into the first oil chamber Y1 through the lower check valve 523, oil is caused to pass through the through-hole 523A formed at the center of the lower check valve 523. Compared to the configuration without the through-hole 523A at the lower check valve 523, the configuration with the through-hole 523A has smaller surface area of the lower check valve 523. In this case, the lower check valve 523 has less area to receive pressure of oil. Accordingly, similarly to the above, the lower check valve 523 is less likely to be opened and damping force to be generated in the compression stroke is more likely to be large.

Further, as indicated by an arrow 6A in FIG. 6, in the extension stroke, oil flowing from the reservoir chamber R0 is caused to flow toward the extension-side oil path 518B as passing beside the compression-side valve 522. Accordingly, the diameter of the compression-side valve 522 is more likely to be small. In other words, when the diameter of the compression-side valve 522 is large, an opening 518F of the extension-side oil path 518B is closed thereby. Accordingly, the diameter of the compression-side valve 522 is set small. In this case, the compression-side valve 522 is less likely to be opened and damping force is more likely to be large.

In contrast, in the present embodiment, the communication path L is located at the outer side in the radial direction of the reservoir chamber R as illustrated in FIG. 3. In other words, the communication path L is located at a position being outer than that in the configuration of FIG. 6. Accordingly, the diameter of the extension-side check valve 52C corresponding to the lower check valve 523 of the above can be enlarged.

In the present embodiment, as illustrated in FIG. 3, there is provided the extension-side check valve 52C (deforming member) that is deformed as being pressed by oil (fluid) flowing toward the communication path L from the inside of the cylinder 11 (pipe-shaped member) in accordance with movement of the piston member 30 (partitioning member). Here, in the axial direction, the extension-side check valve 52C is arranged outside the cylinder 11 as well as outside the outer cylinder body 12 (first outer member). Accordingly, compared to the configuration that the extension-side check valve is arranged at the inside of the cylinder 11 and/or the inside of the outer cylinder body 12, the diameter of the extension-side check valve 52C can be set large.

In this case, when oil flowing from the compression-side oil path 514 is caused to flow through a section being close to an outer circumference of the extension-side check valve 52C in the compression stroke, damping force to be generated in the compression stroke can be set small. On the other hand, when oil flowing from the compression-side oil path 514 is caused to flow through a section being close to the center of the extension-side check valve 52C in the compression stroke by arranging the compression-side oil path 514 at the center side in the radial direction of the lower valve seat 52A, damping force to be generated in the compression stroke can be set large. Thus, in the present embodiment, damping force to be generated in the compression stroke can be set to a value in a wide range.

Further, as illustrated in FIG. 3, it is configured that oil flowing from the reservoir chamber R does not flow through the compression-side valve 51B. Accordingly, the diameter of the compression-side valve 51B can be set large as well. In this case, the compression-side valve 51B is more likely to be opened, so that damping force to be generated in the compression stroke can be set small compared to the comparison example. Here, damping force to be generated in the compression stroke can be set small not being limited to be set large.

Further, as illustrated in FIG. 3, an inlet port 517 through which oil flows into the upper valve seat 51A from the reservoir chamber R is formed at an outer circumferential face of the upper valve seat 51A (at the second side of the compression-side valve 51B). Accordingly, the inlet port 517 is not closed by the compression-side valve 51B even when the diameter of the compression-side valve 51B is set large. Thus, the compression-side valve 51B can be set large in diameter.

In the present embodiment, there is provided the compression-side check valve 51B (deforming member) that is deformed as being pressed by oil (fluid) flowing toward the reservoir chamber R (fluid reservoir portion) from the inside of the cylinder 11 (pipe-shaped member) in accordance with movement of the piston member 30 (partitioning member) in one direction. Here, the path (second connection oil path 512D) through which oil in the reservoir chamber R passes when returning into the cylinder 11 is located on the upstream side from the compression-side valve 51B in the one direction.

In other words, the path (second connection oil path 512D) through which oil in the reservoir chamber R passes when returning into the cylinder 11 is located on the upstream side from the compression-side valve 51B in a direction of movement of the piston member 30 in the compression stroke.

Further, since the reservoir chamber R is arranged at the inner side of the communication path L as illustrated in FIG. 3, oil flowing from the reservoir chamber R can be supplied to the upper valve seat 51A without passing through the intermediate chamber 53. In this case, since oil flowing from the reservoir chamber R is not required to pass beside the compression-side valve 51B, the compression-side valve 51B can be set large in diameter. In this case, damping force to be generated in the compression stroke can be set small not being limited to be set large, so that flexibility for setting damping force can be increased.

[Configuration of Rod Guide 15]

In the following, description will be provided on the rod guide 15 in detail.

As illustrated in FIG. 1, there is provided the rod member 20 that is arranged as being extended in the axial direction of the cylinder 11 (pipe-shaped member) to support the piston member 30 (partitioning member). Further, there is provided the rod guide 15 (guide member) that guides the rod member 20 in motion. Further, there is provided the oil seal 16 (seal member) that is intimately contacted to an outer circumferential face of the rod member 20 as having a gap 90 against the rod guide 15 to prevent leakage of fluid to the outside of the hydraulic buffer device 1 (pressure buffer device). The rod guide 15 includes a flow path 91 that causes oil (fluid) accumulated in the gap 90 between the rod guide 15 and the oil seal 16 to flow into the reservoir chamber R (fluid reservoir portion).

The flow path 91 connects the first side and the second side of the rod guide 15 as being formed along the axial direction of the cylinder portion 10. When movement of the piston member 30 is repeated, oil is accumulated on the second side of the rod guide 15. The accumulated oil flows toward the reservoir chamber R through the flow path 91.

Figure 7:
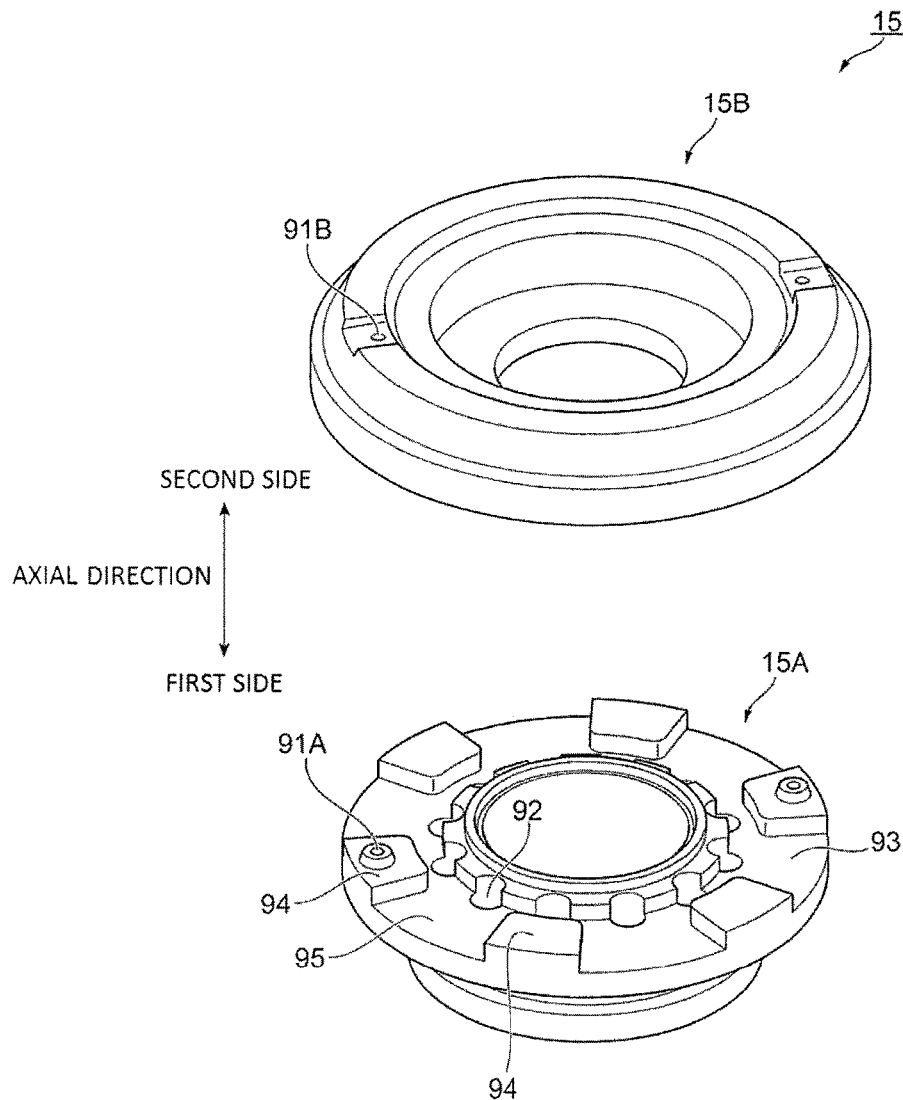
FIG. 7 is a view illustrating a rod guide.

As illustrated in FIG. 7, the rod guide 15 is formed by combining a first-side rod guide 15A and a second-side rod guide 15B. The first-side rod guide 15A includes a first-side through-hole 91A and the second-side rod guide 15B includes a second-side through-hole 91B. The flow path 91 is formed by combining the first-side rod guide 15A and the second-side rod guide 15B to connect the first-side through-hole 91A and the second-side through-hole 91B.

The first-side rod guide 15A includes a connection path 92 that connects the first side and second side of the first-side rod guide 15A. Further, a plurality of projections 94 arranged radially are arranged on an end face 93 on the second side of the first-side rod guide 15A. Oil flowing between the second oil chamber Y2 and the communication path L passes through the connection path 92 and spaces 95 formed between the projections 94 when passing through the rod guide 15.

[Configuration of Bottom Valve Portion 50]

In the following, description will be further provided on the bottom valve portion 50 with reference to FIG. 3.

There is provided the first bottom member 51 (first closing member) that includes the compression-side oil paths 511 and the extension-side oil paths 512 (flow paths) through which oil (fluid) passes and that closes the opening at the end of the cylinder 11 (pipe-shaped member). Further, there is provided the second bottom member 52 (second closing member) that includes the compression-side oil paths 514 and the extension-side oil paths 513 through which oil passes and that closes the opening at the end of the outer cylinder body 12 (first outer member).

The first bottom member 51 and the second bottom member 52 are arranged in a deviated state in the axial direction of the cylinder 11. A convex portion 72 is arranged at one of the first bottom member 51 and the second bottom member 52, the convex portion 72 being fitted to a concave portion 71 that is arranged at the other thereof.

Viewing the one bottom member from the upstream side or the downstream side in the axial direction of the cylinder 11 (i.e., viewing the one bottom member in a direction of an arrow 3A or 3B in FIG. 3), the flow path of the one bottom member and the convex portion 72 of the one bottom member are arranged on a straight line L1 extending from the center C toward an outer circumferential part G in the radial direction of the one bottom member being first bottom member 51. Since the one bottom member is the first bottom member 51 in the present embodiment, the oil path of the one bottom member denotes the compression-side oil path 511.

The convex portion 72 for positioning is arranged at a lower part of the upper valve seat 51A, while the concave portion 71 for positioning is arranged at an upper part of the lower valve seat 52A. Owing to that the convex portion 72 is fitted into the concave portion 71, positioning of the upper valve seat 51A to the lower valve seat 52A is performed.

Since the position of the convex portion 72 and the position of the compression-side oil path 511 of the upper valve seat 51A are deviated in the radial direction of the first bottom member 51, it is facilitated to perform assembling (positioning) of the first bottom member 51 to the second bottom member 52.

As described above, viewing the first bottom member 51 from the upstream side or the downstream side in the axial direction of the cylinder 11 (i.e., viewing the first bottom member 51 in a direction of the arrow 3A or 3B in FIG. 3), the convex portion 72 and the compression-side oil path 511 are arranged on the straight line (virtual line) L1 extending from the center C toward the outer circumferential part G in the radial direction of the first bottom member 51. Accordingly, it is facilitated to assemble the first bottom member 51 to the second bottom member 52.

Assembling of the hydraulic buffer device 1 is performed by putting the respective members sequentially in the damper case 13 from the above in FIG. 3. When assembling the first bottom member 51, the convex portion 72 is located at the lower part of the first bottom member 51. Here, a worker to perform the assembling cannot have visual contact with the convex portion 72 as having possible difficulty for the assembling.

In the present embodiment, since the convex portion 72 and the compression-side oil path 511 are located on the straight line L1 as described above, a worker can perceive the position of the convex portion 72 simply by confirming the position of the compression-side oil path 511. Specifically, a worker can perceive that the convex portion 72 is located at the outside of the compression-side oil path 511.

Thus, a worker can perceive the position of the convex portion 72 and assembling of the first bottom member 51 to the second bottom member 52 can be easily performed.

In the present embodiment, the convex portion 72 is arranged at the first bottom member 51 and the concave portion 71 is arranged at the second bottom member 52. However, it is also possible to arrange the convex portion 72 at the second bottom member 52 and the concave portion 71 at the first bottom member 51.

Figure 8:
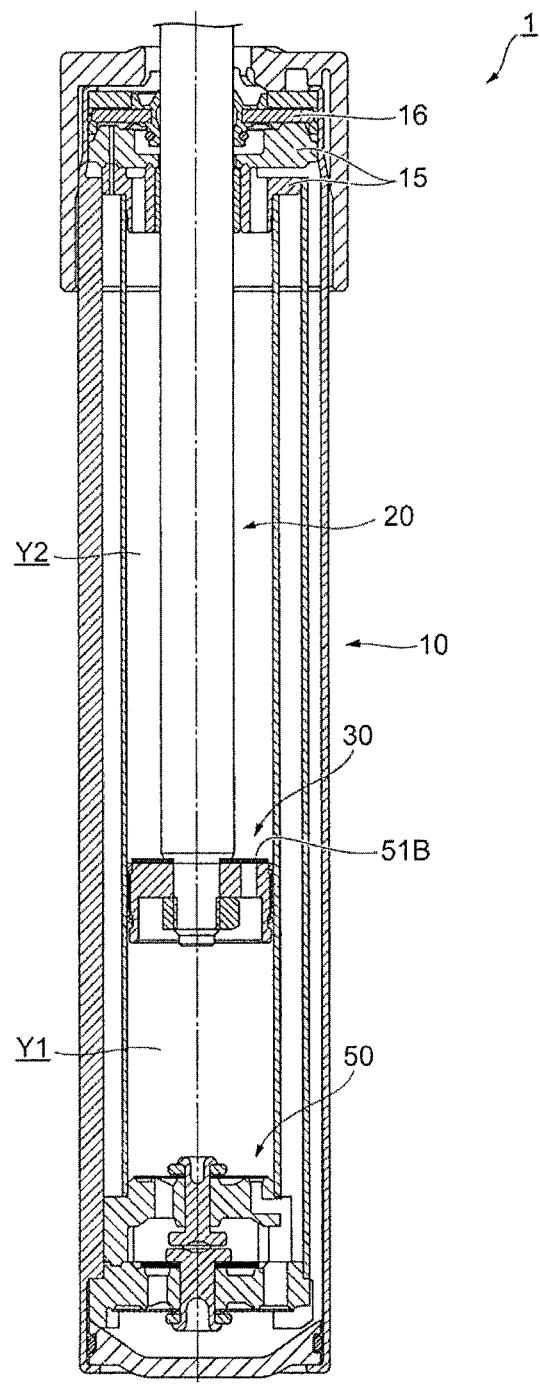
FIG. 8 is a view illustrating another configuration example of the hydraulic buffer device.

In the above, description is provided on the case that both the compression-side valve 51B and the extension-side valve 52B are arranged at the bottom valve portion 50. Here, such a configuration is just an example. For example, it is also possible to arrange the compression-side valve 51B on the second side of the piston member 30 as illustrated in FIG. 8. In this case, damping force is generated owing to that the compression-side valve 51B at the piston member 30 is opened in the compression stroke. In this case, the compression-side valve 51B is not arranged at the bottom valve portion 50.

Further, it is also possible that a compression-side valve 51B and an extension-side valve are further arranged at the piston member 30 with the compression-side valve 51B and the extension-side valve 52B arranged at the bottom valve portion 50.

Further, it is also possible that damping force to be generated is caused to be variable by varying deformation amounts of the compression-side valve and the extension-side valve.

[Varying Mechanism of Damping Force]

Figure 9:
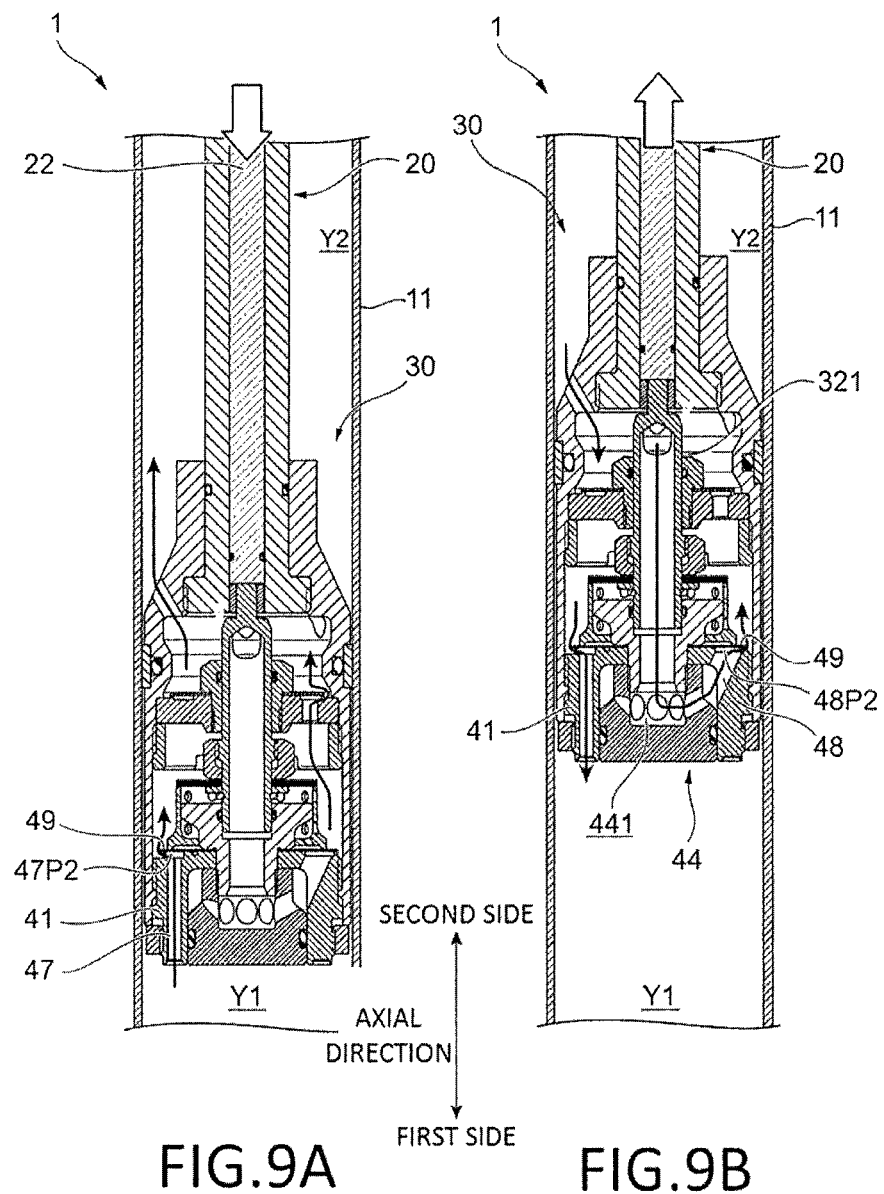
FIGS. 9A and 9B are views illustrating a varying mechanism of damping force.

FIGS. 9A and 9B illustrate a varying mechanism of damping force. Here, only components of the piston member 30 are illustrated in FIGS. 9A and 9B. However, similarly to the above, the bottom valve portion 50 including the compression-side valve 51B and the extension-side valve 52B are arranged at the end on the first side of the hydraulic buffer device 1.

As illustrated in FIG. 9A, the piston member 30 includes a valve seat 41 having a flow path for oil. Further, the piston member 30 includes a compression-side oil path 47 through which oil flows from the first oil chamber Y1 toward the second oil chamber Y2 in accordance with movement of the piston member 30 toward the first side. Oil passing through the compression-side oil path 47 flows out from a first oil path port 47P2 at an end on the second side of the valve seat 41.

Further, as illustrated in FIG. 9B, the piston member 30 includes an extension-side oil path 48 through which oil flows from the second oil chamber Y2 toward the first oil chamber Y1 in accordance with movement of the piston member 30 toward the second side. Oil passing through the extension-side oil path 48 flows out from a second oil path port 48P2 at an end on the second side of the valve seat 41.

Further, as illustrated in FIGS. 9A and 9B, the piston member 30 includes a damping valve 49 that closes the first oil path port 47P2 and the second oil path port 48P2. Further, there are provided a transmitting member 22 and a spool 321 that are capable of being interlocked with the damping valve 49 for adjusting the position of the damping valve 49. Further, a drive mechanism (not illustrated) such as a motor is arranged for moving the transmitting member 22 and the spool 321 in the axial direction. The transmitting member 22 and the spool 321 are moved by the drive mechanism. Accordingly, a pressing amount of the damping valve 49 against the valve seat 41 is varied, so that damping force is varied.

[Configuration of Compression-Side Check Valve 51C]

In the following, description will be provided on the compression-side check valve 51C in detail with reference to FIG. 3.

In the present embodiment, the compression-side check valve 51C includes a valve plate 42 and a reinforcement plate 43. The reinforcement plate 43 is overlapped on the valve plate 42 to prevent occurrence of bending and the like of the valve plate 42. The valve plate 42 is arranged between the reinforcement plate 43 and the upper valve seat 51A.

Figure 10:
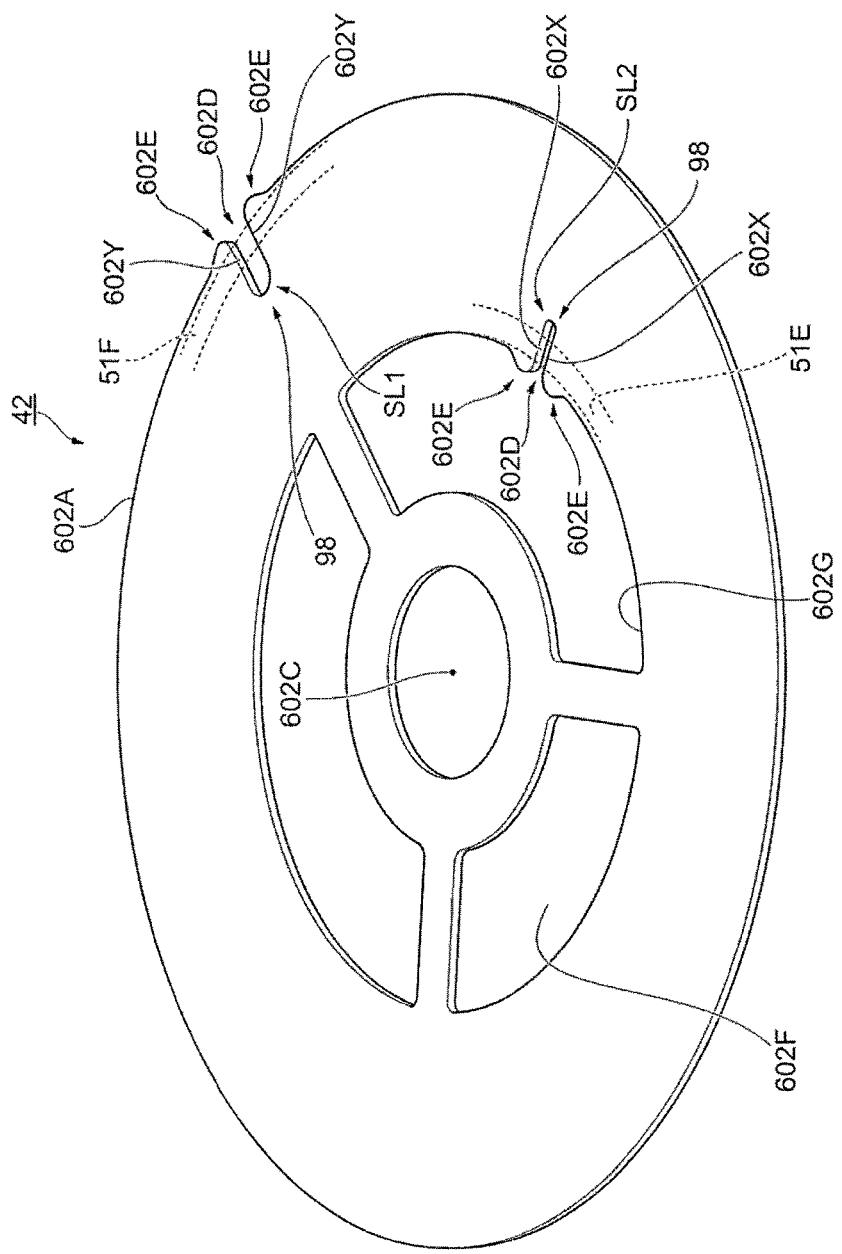
FIG. 10 is a perspective view of a valve plate.

FIG. 10 is a perspective view of the valve plate 42.

As illustrated in FIG. 3, there is provided the upper valve seat 51A (fluid circulating member) including the extension-side oil path 512 (flow path) through which oil (fluid) passes in accordance with movement of the piston member 30 (not illustrated in FIG. 3) and the upper outlet port 512A (outlet port) from which oil passing through the extension-side oil path 512 flows out. Further, as illustrated in FIGS. 3 and 10, there is provided the valve plate 42 (closing member) that closes the extension-side oil path 512 as being capable of being opened and closed.

As illustrated in FIG. 10, there is provided, at an outer circumference 602A of the valve plate 42, a slit SL1 (hereinafter, called an outer slit SL1) extending from the outer circumferential part 602A of the valve plate 42 toward the center 602C in the radial direction of the valve plate 42 with an opening 602D formed at the outer circumference 602A. Further, protruded portions 602E are formed at both sides of the opening portion 602D as being protruded outward in the radial direction of the valve plate 42 from the outer circumference 602A.

The valve plate 42 is formed into a disc shape. Three openings 602F laid out along the circumferential direction of the valve plate 42 are formed at the valve plate 42. An inner circumference 602G of the valve plate 42 is formed as facing the openings 602F.

A slit SL2 (hereinafter, called an inner slit SL2) extending from the inner circumference 602G toward the outer circumference 602A is formed at the inner circumference 602G. An opening 602D is formed at a part where the inner slit SL2 intersects with the inner circumference 602G. Two protruded portions 602E are also formed at the inner circumference 602G as being arranged at both sides of the opening 602D of the inner slit SL2.

In the present embodiment, as described above, when the piston member 30 is moved toward the second side in the axial direction, oil flows flowing from the communication path L and the reservoir chamber R toward the first oil chamber Y1 through the extension-side oil path 512 of the upper valve seat 51A.

More specifically, when the piston member 30 is moved toward the second side at a predetermined speed or higher, pressure in the first oil chamber Y1 decreases and pressure in the second chamber Y2 increases, so that the valve plate 42 is opened. Accordingly, oil flowing from the communication path L and the reservoir chamber R flows toward the first oil chamber Y1 through the extension-side oil path 512.

In contrast, when the piston member 30 is moved at a speed lower than the predetermined speed, the valve plate 42 is not opened. In this case, oil flowing from the communication path L and the reservoir chamber R flows into the first oil chamber Y1 through the outer slit SL1 and the inner slit SL2.

The upper valve seat MA includes an inner seating face 51E and an outer seating face 51F as indicated by broken lines in FIG. 10. The valve plate 42 is pressed toward the inner seating face 51E and the outer seating face 51F.

As passing through the inner slit SL2, oil flows into the inner slit SL2 through a base part 98 of the inner slit SL2. Then, oil passes through a section of the inner slit SL2 facing the inner seating face 51E as flowing toward the opening 602D. Thus, oil flowing from the communication oil path L and the reservoir chamber R flows into the first oil chamber Y1.

As passing through the outer slit SL1, oil flows into the outer slit SL1 through a base part 98 of the outer slit SL1. Then, oil passes through a section of the outer slit SL1 facing the outer seating face 51F as flowing toward the opening 602D. Thus, oil flowing from the communication path L and the reservoir chamber R flows into the first oil chamber Y1.

According to the outer slit SL1 and the inner slit SL2, it becomes easier for the valve plate 42 to be apart from the outer seating face 51F and the inner seating face 51E. When oil passes through the outer slit SL1, a part of oil enters a section where the valve plate 42 is intimately contacted to the outer seating face 51F at both sides of the outer slit SL1. Similarly, when oil passes through the inner slit SL2, a part of oil enters a section where the valve plate 42 is intimately contacted to the inner seating face 51E at both sides of the inner slit SL2. Accordingly, compared to a configuration without oil entering, it is easier for the valve plate 42 to be apart from the outer seating face 51F and the inner seating face 51E.

As illustrated in FIG. 10, the protruded portions 602E are formed at both sides of the opening 602D of the inner slit SL2 and both sides of the opening 602D of the outer slit SL1. More specifically, the inner slit SL2 and the outer slit SL1 are formed by performing cutting process on the valve plate 42 provided with the protruded portions 602E. Accordingly, edges of the inner slit SL2 facing the inner seating face 51E as indicated by reference 602X in FIG. 10 are formed linearly, so that an oil flow rate through the inner slit SL2 is more likely to be matched to a designed value. Similarly, edges of the outer slit SL1 facing the outer seating face 51F as indicated by reference 602Y in FIG. 10 are formed linearly, so that an oil flow rate through the outer slit SL1 is more likely to be matched to a designed value.

The above description is provided on the case that the outer slit SL1, the inner slit SL1, and the protruded portions 602E are formed at the valve plate 42 that is installed on a triple-pipe structure formed of the cylinder 11, the outer cylinder body 12, and the damper case 13. However, not limited to the hydraulic buffer device 1 having the triple-pipe structure, the valve plate 42 having the outer slit SL1, the inner slit SL2, and the protruded portions 602E may be installed on a hydraulic buffer device 1 having a double-pipe structure formed of the cylinder 11 and the outer cylinder body 12.

Figure 11:
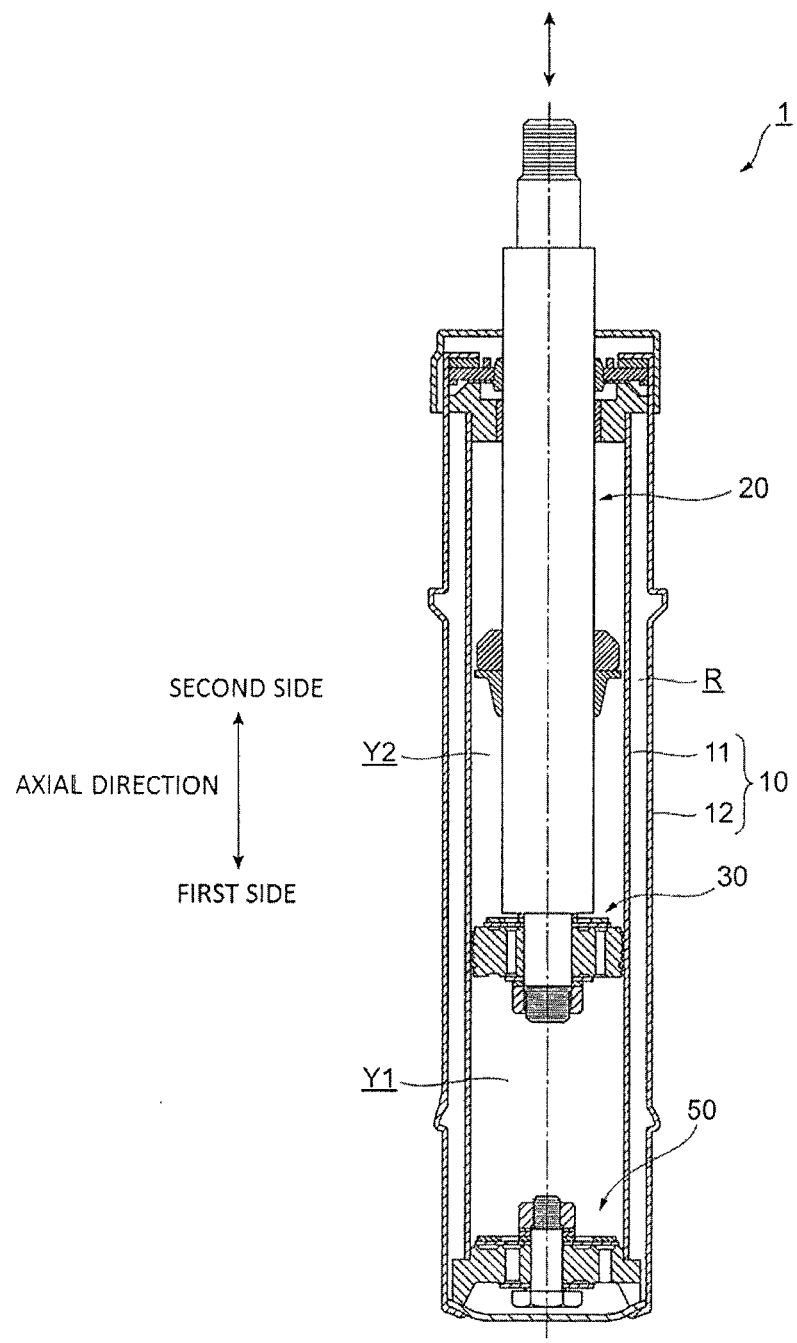
FIG. 11 is a view illustrating a hydraulic buffer device having a double-pipe structure.
Figure 12:
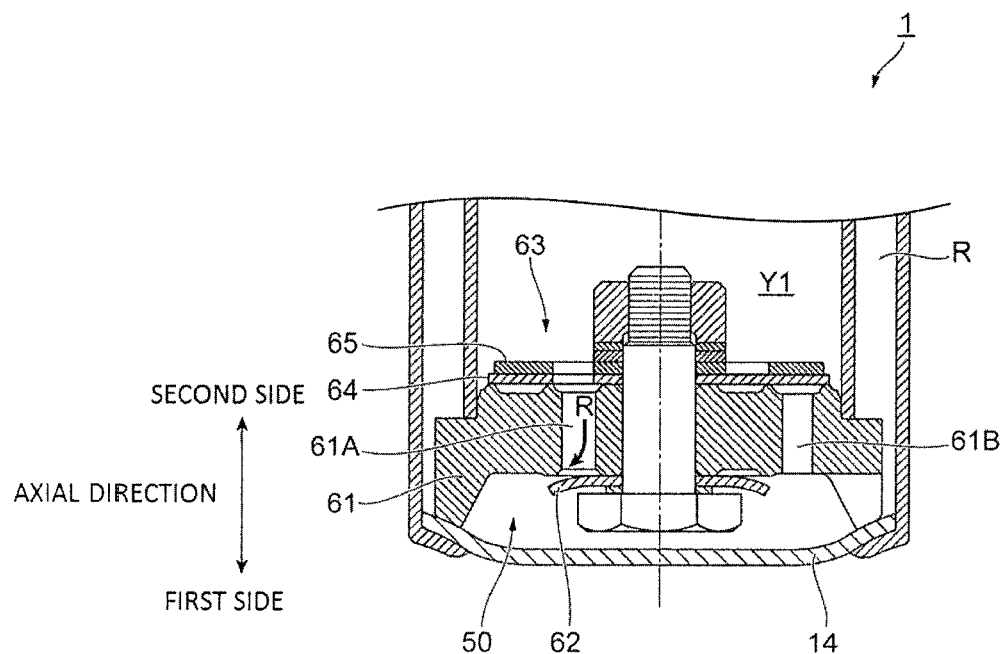
FIG. 12 is a view illustrating the hydraulic buffer device having a double-pipe structure.
Figure 13:
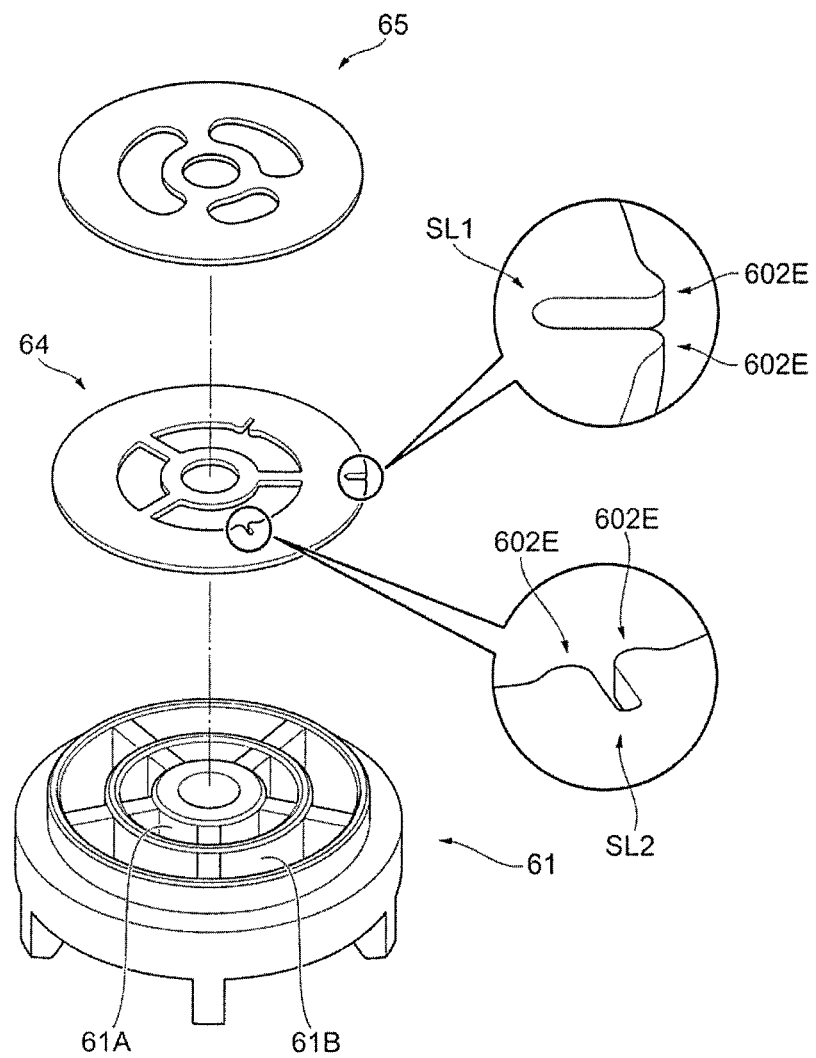
FIG. 13 is a view illustrating the hydraulic buffer device having a double-pipe structure.

FIGS. 11 to 13 are views illustrating the hydraulic buffer device 1 having a double-pipe structure. Here, the same reference is given to a portion having the same function as described above and description thereof is not repeated.

In this example, as illustrated in FIG. 11, the communication path L is not arranged. Further, an outer cylinder body 12 is arranged at the outer side of a cylinder 11 and a reservoir chamber R is formed between the cylinder 11 and the outer cylinder body 12.

As illustrated in FIG. 12, a bottom valve portion 50 includes a valve seat 61, a compression-side valve 62, and a check valve 63. The check valve 63 includes a valve plate 64 and a reinforcement plate 65.

In the following, description will be provided on basic operation of the bottom valve portion 50.

When a piston member 30 (see FIG. 11) is moved toward the first side in the axial direction, pressure in the first oil chamber Y1 is increased. Accordingly, as indicated by an arrow R in FIG. 12, oil flows from the first oil chamber Y1 toward a bottom portion 14 through a compression-side oil path 61A. At that time, oil passes through the compression-side valve 62 and damping force is generated.

On the other hand, when the piston member 30 is moved toward the second side in the axial direction, pressure in the first oil chamber Y1 is decreased. Accordingly, oil flowing from the reservoir chamber R flows toward the first oil chamber Y1 through an extension-side oil path 61B (see FIG. 12). At that time, the valve plate 64 is opened.

In this example as well, the outer slit SL1, the inner slit SL2, and the protruded portions 602E are formed at the valve plate 64, as illustrated in FIG. 13. Accordingly, in this example as well, when the piston member 30 is moved at a speed lower than a predetermined speed, oil is caused to flow from the extension-side oil path 61B to the first oil chamber Y1 or from the first oil chamber Y1 to the extension-side oil path 61B. At that time, oil passes through the outer slit SL1 and the inner slit SL2.

The invention claimed is:

1. A pressure buffer device, comprising:
   a pipe-shaped member that stores fluid;
   a partitioning member that partitions a space in the pipe-shaped member into a first space and a second space as being movable in an axial direction of the pipe-shaped member;
   a fluid reservoir portion that stores fluid in accordance with movement of the partitioning member as being arranged at an outer side of the pipe-shaped member in a radial direction of the pipe-shaped member;
   a communication path that provides communication between the first space and the second space as being arranged at an outer side of the fluid reservoir portion in the radial direction of the pipe-shaped member;
   a first outer member having a pipe shape arranged at the outer side of the pipe-shaped member in the radial direction of the pipe-shaped member;
   a second outer member having a pipe shape arranged at an outer side of the first outer member in the radial direction of the pipe-shaped member; and
   a plurality of ribs that connect the first outer member and the second outer member.

2. The pressure buffer device according to claim 1, wherein
   a space between the pipe-shaped member and the first outer member serves as the fluid reservoir portion, and
   a space between the first outer member and the second outer member serves as the communication path.

3. The pressure buffer device according to claim 1, further comprising a deforming member that is deformed as being pressed by fluid flowing toward the communication path from an inside of the pipe-shaped member in accordance with movement of the partitioning member,
   wherein the deforming member is arranged outside the pipe-shaped member and outside the first outer member.

4. The pressure buffer device according to claim 1, further comprising a deforming member that is deformed as being pressed by fluid flowing toward the fluid reservoir portion from an inside of the pipe-shaped member in accordance with movement of the partitioning member in one direction,
   wherein a path through which fluid in the fluid reservoir portion passes when returning into the pipe-shaped member is located on an upstream side from the deforming member in the one direction.

5. The pressure buffer device according to claim 1, wherein at least two of the pipe-shaped member, the first outer member, and the second outer member are formed integrally.

6. The pressure buffer device according to claim 1, further comprising:
   a rod member that supports the partitioning member as being extended in the axial direction of the pipe-shaped member;
   a guide member that guides the rod member in motion; and
   a seal member that prevents leakage of fluid to an outside of the pressure buffer device as being arranged in intimate contact with an outer circumference of the rod member with a gap formed against the guide member,
   wherein a flow path that causes fluid accumulated in the gap between the guide member and the seal member to flow into the fluid reservoir portion is arranged at the guide member.

7. The pressure buffer device according to claim 1, further comprising:
   a first closing member that includes a flow path through which fluid passes and that closes an opening at an end of the pipe-shaped member; and
   a second closing member that includes a flow path through which fluid passes and that closes an opening at an end of the first outer member, wherein
   the first closing member and the second closing member are arranged in the axial direction of the pipe-shaped member,
   a convex portion is arranged at one closing member of the first closing member and the second closing member, the convex portion being fitted into a concave portion that is arranged at the other closing member thereof, and
   the flow path of the one closing member and the convex portion at the one closing member are arranged on a straight line extending from the center toward an outer circumferential part of the one closing member in the radial direction when viewing the one closing member from an upstream side or a downstream side in the axial direction of the pipe-shaped member.

8. The pressure buffer device according to claim 1, further comprising:
   a fluid circulating member that includes a flow path through which fluid flows in accordance with movement of the partitioning member and an outlet port from which fluid passing through the flow path flows out; and
   a closing member that closes the outlet port as being capable of being opened and closed,
   wherein, the closing member is provided with, at an outer circumference thereof, a slit extending from the outer circumference of the closing member toward a center part in the radial direction of the closing member with an opening formed at the outer circumference, and protruded portions formed at both sides of the opening as being protruded outward from the outer circumference of the closing member in the radial direction of the closing member.

9. The pressure buffer device according to claim 1, wherein
   the plurality of ribs are extended in an axial direction of the first outer member and the second outer member.

10. The pressure buffer device according to claim 1, wherein
    the plurality of ribs are arranged radially from a center of the first outer member and the second outer member in the radial direction.

* * * * *